United States Patent
Schrank et al.

(10) Patent No.: US 10,371,133 B2
(45) Date of Patent: Aug. 6, 2019

(54) WATER PUMP ASSEMBLY

(71) Applicants: Bradley John Schrank, Blooming Prairie, MN (US); Nathan Rittenour, Kasson, MN (US)

(72) Inventors: Bradley John Schrank, Blooming Prairie, MN (US); Nathan Rittenour, Kasson, MN (US)

( * ) Notice: Subject to any disclaimer, the term of this patent is extended or adjusted under 35 U.S.C. 154(b) by 129 days.

(21) Appl. No.: 15/595,331

(22) Filed: May 15, 2017

(65) Prior Publication Data

US 2017/0328358 A1    Nov. 16, 2017

Related U.S. Application Data

(60) Provisional application No. 62/337,114, filed on May 16, 2016.

(51) Int. Cl.
| | |
|---|---|
| *F04B 9/14* | (2006.01) |
| *F04B 43/10* | (2006.01) |
| *F04B 43/067* | (2006.01) |
| *F04B 43/107* | (2006.01) |
| *F04B 47/02* | (2006.01) |
| *F04B 43/08* | (2006.01) |
| *F04B 49/24* | (2006.01) |
| *F04B 53/10* | (2006.01) |
| *F16K 31/06* | (2006.01) |

(52) U.S. Cl.
CPC .............. *F04B 9/14* (2013.01); *F04B 43/067* (2013.01); *F04B 43/084* (2013.01); *F04B 43/10* (2013.01); *F04B 43/107* (2013.01); *F04B 47/024* (2013.01); *F04B 49/24* (2013.01); *F04B 53/1002* (2013.01); *F04B 47/02* (2013.01); *F16K 31/0662* (2013.01)

(58) Field of Classification Search
CPC .......... F04B 9/14; F04B 43/10; F04B 43/107; F04B 43/067
See application file for complete search history.

(56) References Cited

U.S. PATENT DOCUMENTS

| 583,471 A | * | 6/1897 | Harrison | ................... F04B 9/14 |
| | | | | 417/544 |
| 2,814,993 A | * | 12/1957 | Schmidt | .................. F04B 43/08 |
| | | | | 277/336 |
| 2,883,935 A | * | 4/1959 | Schmidt | ............... F04B 43/107 |
| | | | | 181/230 |
| 3,857,401 A | * | 12/1974 | Khanin | ................... F16K 47/00 |
| | | | | 137/1 |

(Continued)

*Primary Examiner* — Peter J Bertheaud (57) ABSTRACT

A water pump assembly includes a lower housing configured for being positioned within a well. The lower housing includes a bladder therein. The bladder expands to force water within the housing into an outlet of a valve apparatus and the bladder contracts to draw water into the housing. A cylinder and piston fluidly coupled to an inlet of the valve apparatus and the inlet is fluidly coupled to the bladder. A one way valve is positioned within the valve apparatus and fluidly connects an inlet chamber including the inlet to an outlet chamber including the outlet. The one way valve allows water to flow from the outlet chamber into the inlet chamber and restricts water from flowing from the inlet chamber into the outlet chamber. An outlet conduit is fluidly coupled to the outlet of the valve apparatus to carry the water where desired.

8 Claims, 11 Drawing Sheets

(56) References Cited

U.S. PATENT DOCUMENTS 4,008,008 A * 2/1977 Vergnet ............... F04B 43/0072
                                                    417/385
4,111,613 A * 9/1978 Sperry ................. F04B 43/009
                                                    417/394
4,822,257 A * 4/1989 Olofsson ................ F04B 43/10
                                                    417/389

* cited by examiner

WATER PUMP ASSEMBLY

CROSS-REFERENCE TO RELATED APPLICATIONS

This application claims benefit of the provisional application 62/337,114 filed May 16, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to pump devices and more particularly pertains to a new pump device for drawing fluids efficiently out of a wall while preventing contaminants from entering the well.

BRIEF SUMMARY OF THE INVENTION

An embodiment of the disclosure meets the needs presented above by generally comprising a lower housing configured for being positioned within a well. The lower housing includes a bladder therein. The bladder expands to force water within the housing into an outlet of a valve apparatus and the bladder contracts to draw water into the housing. A cylinder and piston fluidly coupled to an inlet of the valve apparatus and the inlet is fluidly coupled to the bladder. A one way valve is positioned within the valve apparatus and fluidly connects an inlet chamber including the inlet to an outlet chamber including the outlet. The one way valve allows water to flow from the outlet chamber into the inlet chamber and restricts water from flowing from the inlet chamber into the outlet chamber. An outlet conduit is fluidly coupled to the outlet of the valve apparatus to carry the water where desired.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 25 thereof, a new pump device embodying the principles and concepts of an embodiment of the disclosure and generally designated by the reference numeral 10 will be described.

Figure 1:
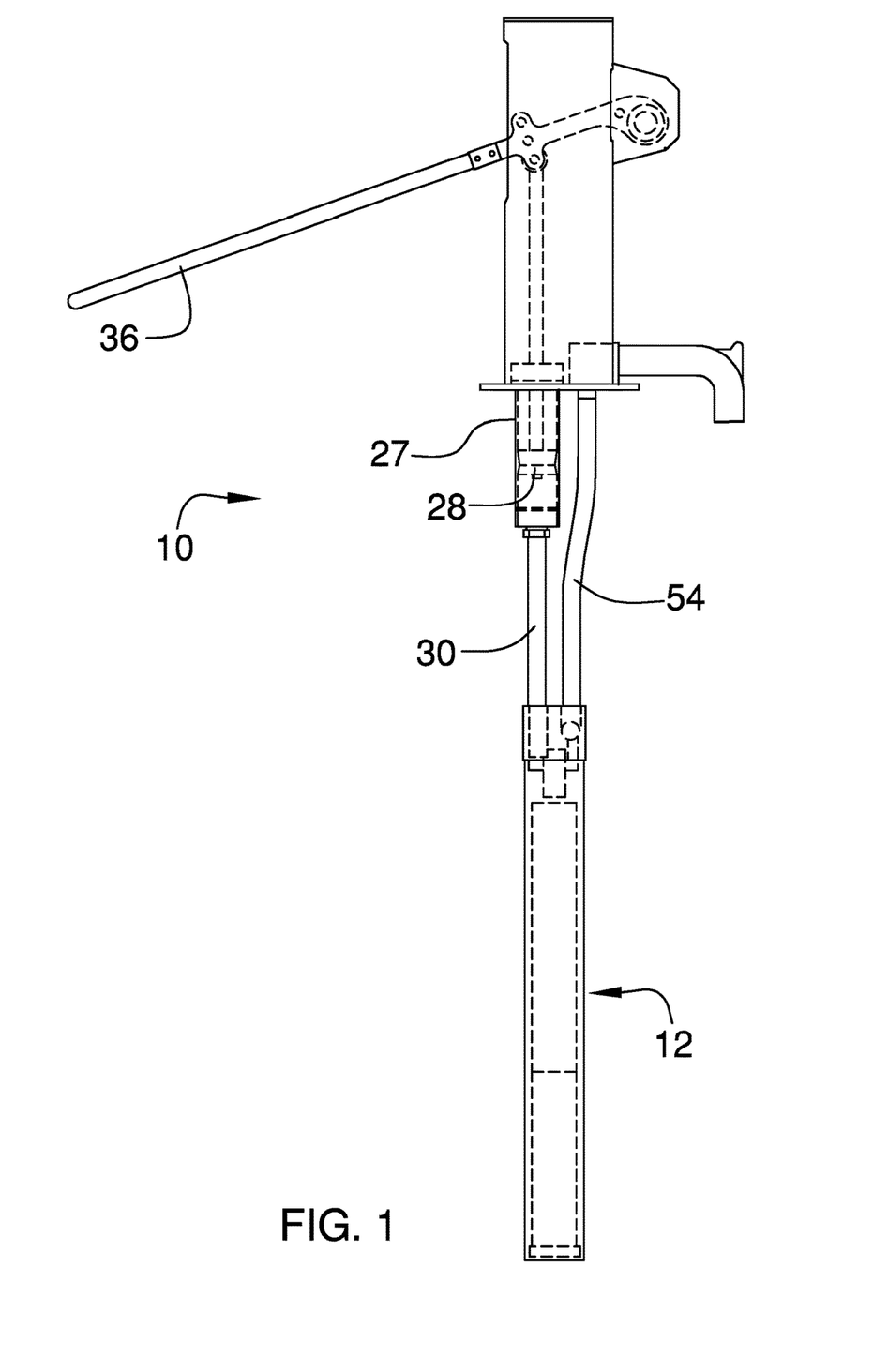
FIG. 1 is a front view of a water pump assembly according to an embodiment of the disclosure.
Figure 2:
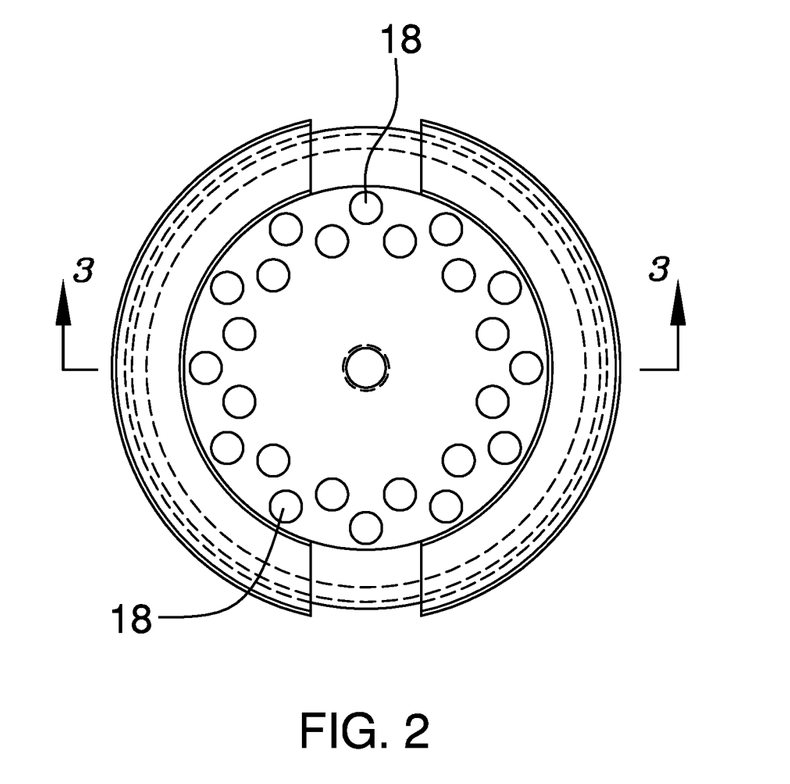
FIG. 2 is a top view of a plate of a one way valve of an embodiment of the disclosure.
Figure 3:
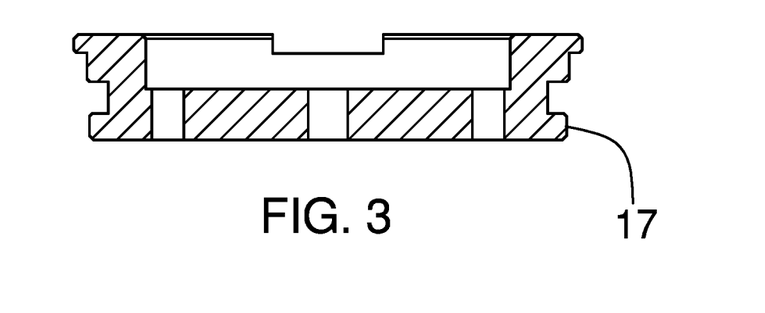
FIG. 3 is cross-sectional view taken along line 3-3 of FIG. 2 of an embodiment of the disclosure.
Figures 4, 5, 6:
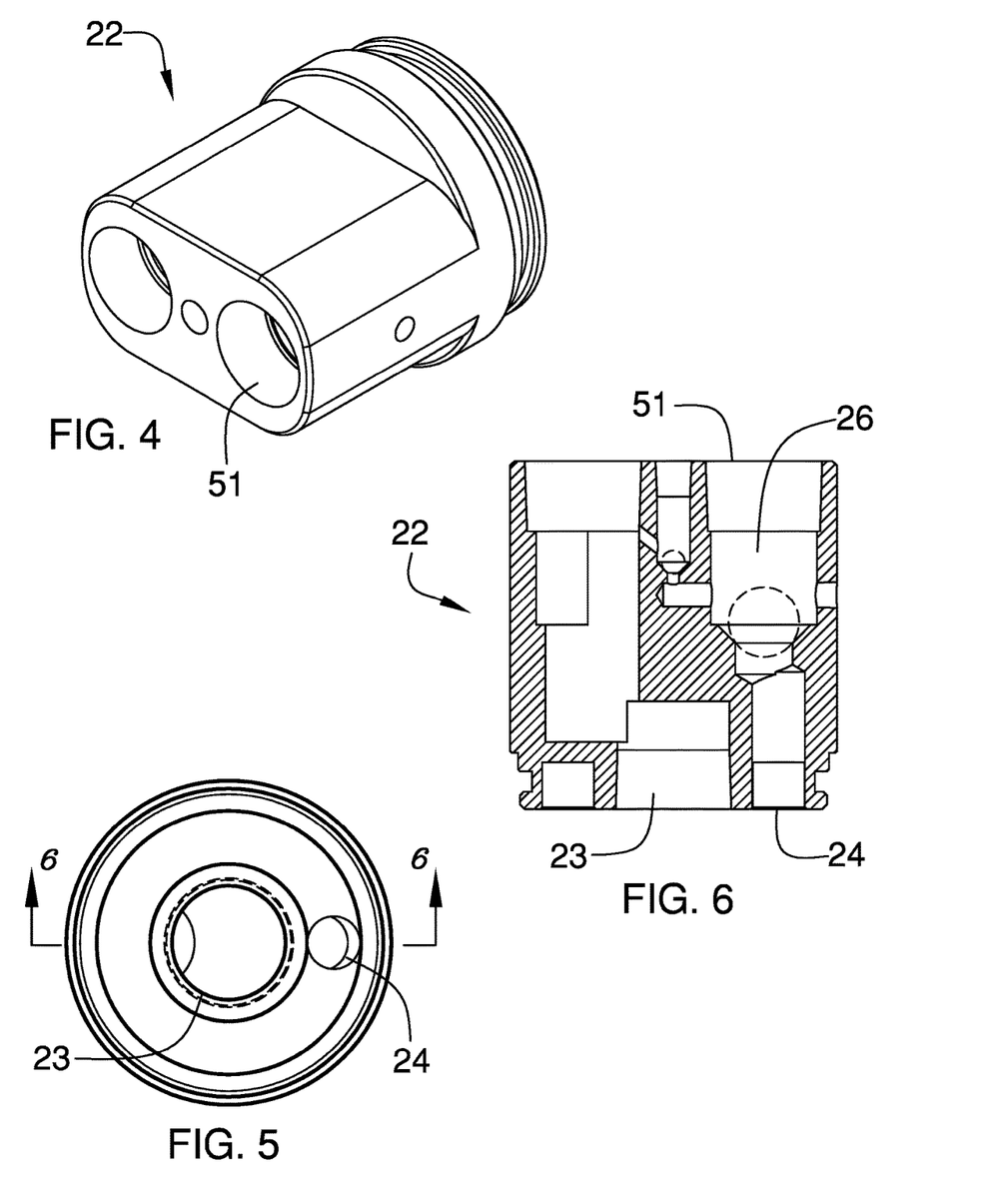
FIG. 4 is a top perspective of an embodiment of the disclosure of a valve apparatus.
FIG. 5 is a bottom view of an embodiment of the disclosure of a valve apparatus of an embodiment of the disclosure.
FIG. 6 is cross-sectional view taken along 6-6 of FIG. 5 of an embodiment of the disclosure.
Figure 7:
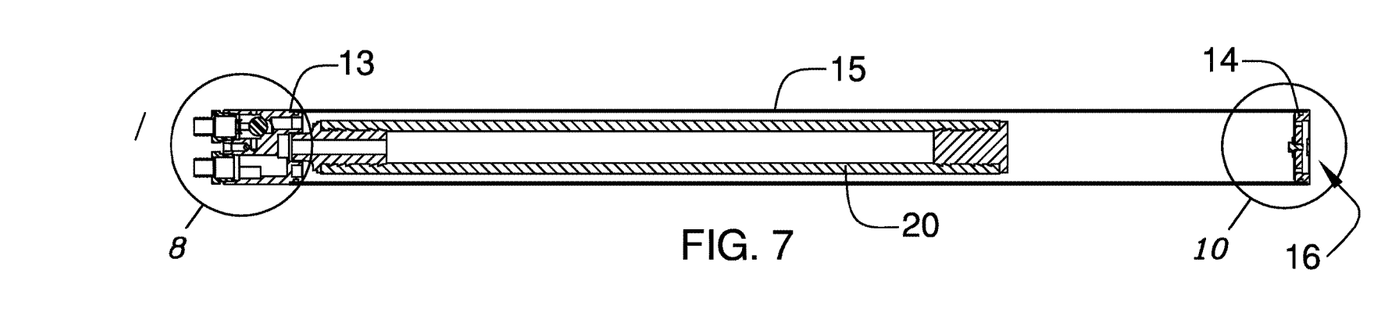
FIG. 7 is a cross-sectional view of a lower housing of an embodiment of the disclosure of a valve apparatus.

As best illustrated in FIGS. 1 through 25, the water pump assembly 10 generally comprises a lower housing 12 that is positionable into a well and which includes an upper end 13, a lower end 14 and a perimeter wall 15 extending between the upper 13 and lower 14 ends. The lower end 14 includes a one way valve 16 for allowing water (or other fluid and hereafter fluid is being used to designate any fluid and in particular any liquid being moved with the assembly 10) into the lower housing 12 but restricting water from leaving through the lower end 14. As can be seen in FIGS. 2, 3 and 10, the one way valve 16 includes a plate 17 with a plurality of apertures 18 extending therethrough on top of which a gasket 19 is mounted so that as a vacuum is formed within the lower housing 12, the edge of the gasket 19 lifts to allow water or other fluid to enter the lower housing 12 through the apertures 18 and around the flexible gasket 19. However, not shown, a pump may be attached to the plate 17 without the gasket and used for powered movement of fluids into the lower housing 12.

Within the lower housing 12 is a bladder 20 attached to the upper end which is filled and emptied during the operation of the assembly 10. As the bladder 20 is filed it moves toward the lower end 14 to drive fluid within the lower housing 12 outwardly of the upper end 13. As the bladder 20 retracts away from the lower end 14, a vacuum is created within the lower housing 12 to pull fluid through the one way valve 16. The bladder 20 comprises a structure which restricts stretching in any direction but longitudinally from the upper end 13 to the lower end 14 of the lower housing 12.

Figure 8:
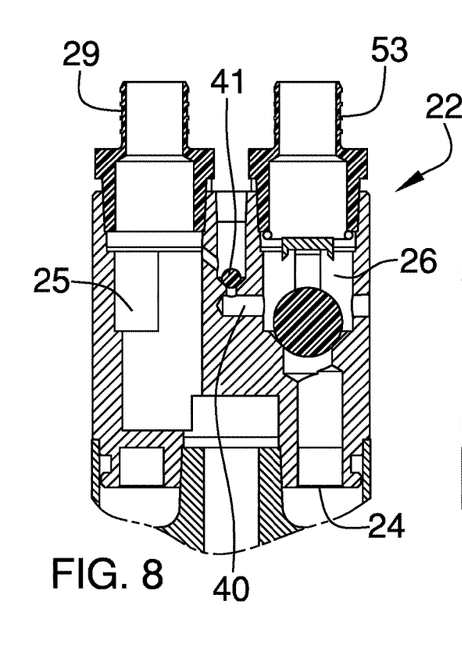
FIG. 8 is an enlarged view of area "8" of FIG. 7 of an embodiment of the disclosure of a valve apparatus.
Figures 9, 10:
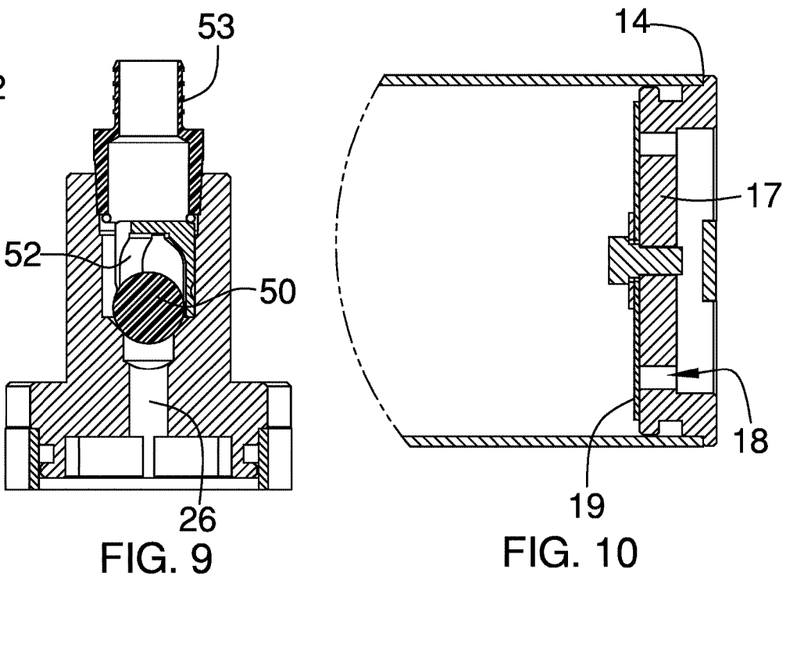
FIG. 9 is a cross-sectional view of the valve apparatus taken perpendicular to FIG. 8 and through ball valve 50 of an embodiment of the disclosure.
FIG. 10 is an enlarged view of area "10" of FIG. 7 of an embodiment of the disclosure.
Figure 11:
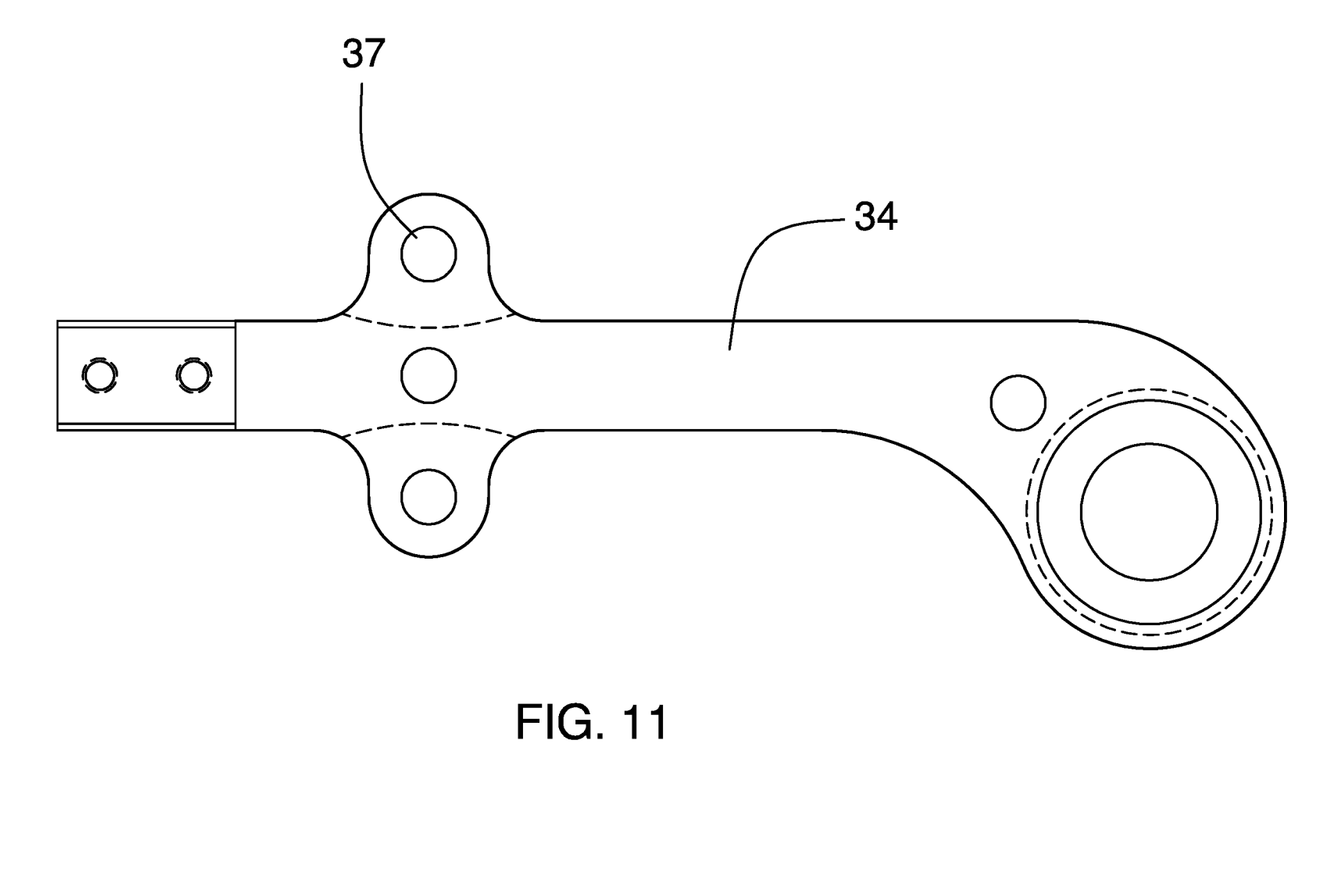
FIG. 11 is a side view of an actuator of an embodiment of the disclosure.
Figure 12:
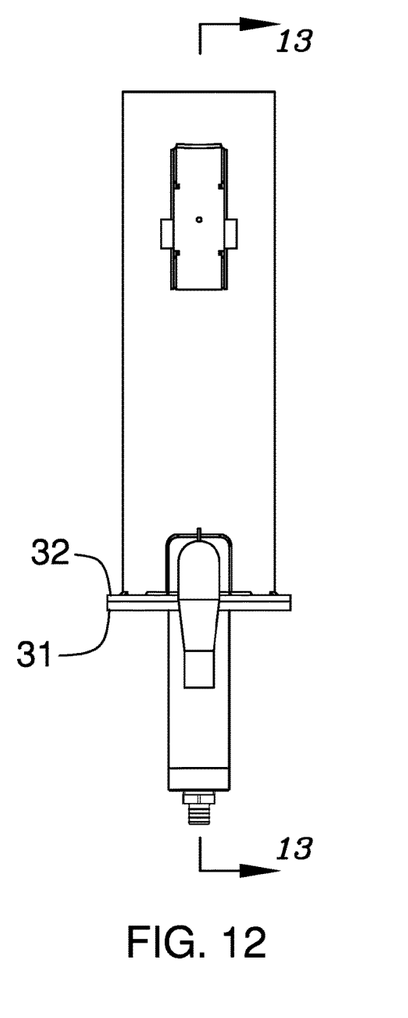
FIG. 12 is a side view of an embodiment of the disclosure of a valve apparatus.

A valve apparatus 22 shown in FIGS. 4-6, 8 and 9 and is attached to the upper end 13 of the lower housing and is in fluid communication with the lower housing 12 and bladder 20. The valve apparatus 22 includes an inlet 23 fluidly coupled to the bladder 20 and an outlet 24 for receiving a fluid from the lower housing 12. The valve apparatus 22 includes an inlet chamber 25 fluidly coupled to the inlet 23 and an outlet chamber 26 fluidly coupled to the outlet 24. The inlet chamber 25 is in fluid communication with a cylinder 27 and piston 28 (shown in FIG. 6) for forcing fluid downwardly into the bladder 20 as well as pulling fluid outwardly of the bladder 20. As can be seen in FIG. 8, the inlet chamber 25 is fluidly coupled to a connector 29 which in turn is fluidly coupled to a supply line 30 at the bottom of the cylinder 27 which includes a threaded male connector as shown in FIG. 12 for attachment to the supply line 30. The supply line 30 is in fluid communication with the cylinder 27 such that fluid is forced into the supply line 30 when the piston 28 is moved downwardly and then the fluid is then moved into the bladder 20 to expand the bladder 20 and drive water into the outlet 24. When the piston 28 is moved upwardly a vacuum is created within the cylinder 27 to draw the fluid outwardly of the supply line 30 and the bladder 20 to retract the bladder 20.

Figure 13:
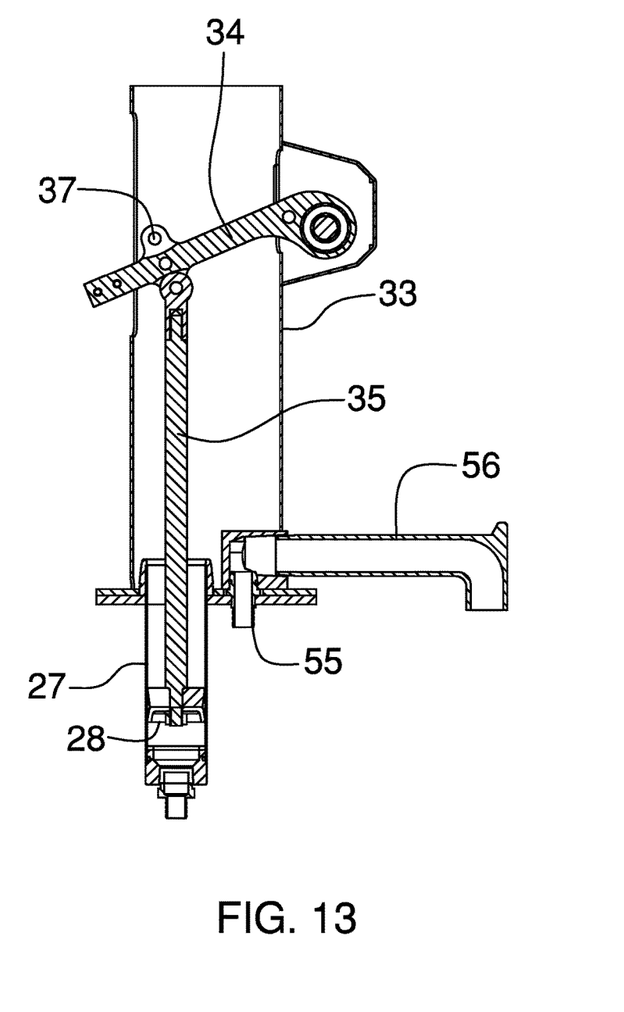
FIG. 13 is a cross-sectional view taken along line 13-13 of FIG. 12 of an embodiment of the disclosure.
Figure 14:
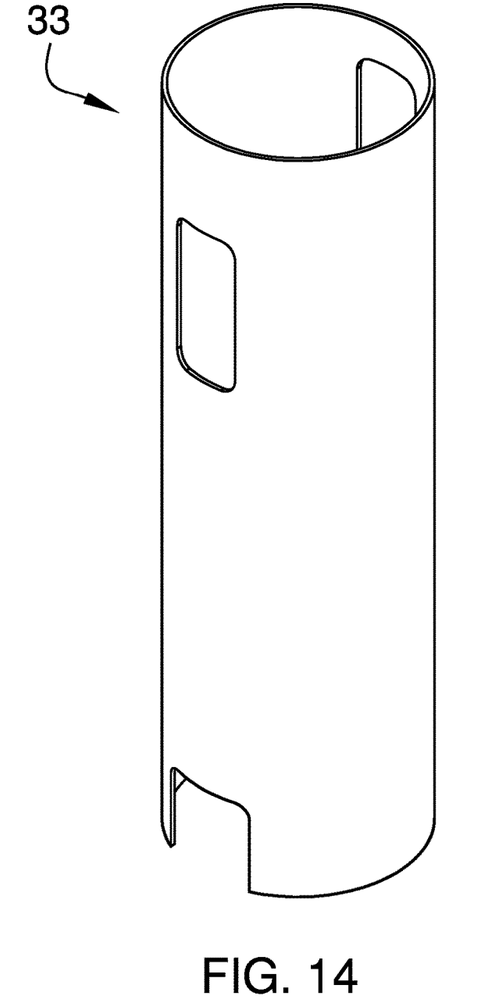
FIG. 14 is a top perspective of an embodiment of the disclosure of an upper housing.
Figure 15:
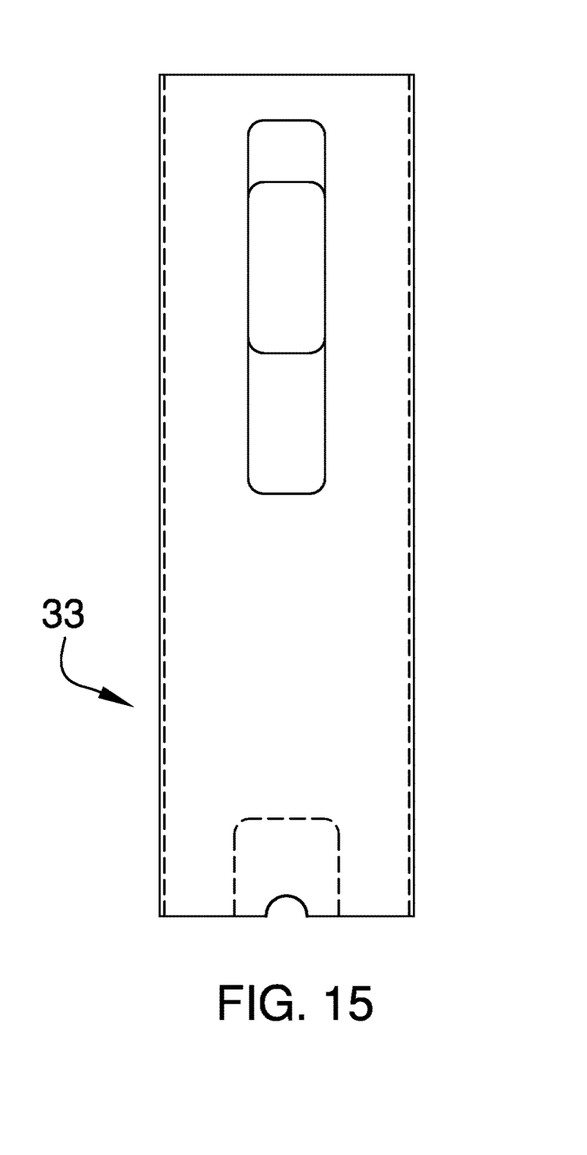
FIG. 15 is side view of the upper housing of an embodiment of the disclosure.
Figure 16:
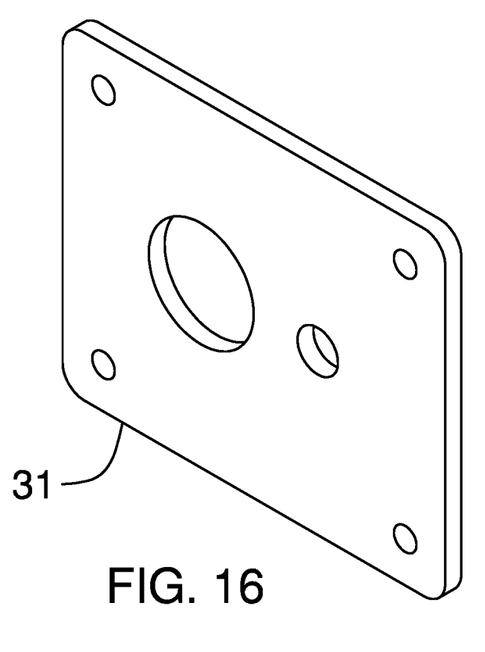
FIG. 16 is a front perspective view of a first plate of an embodiment of the disclosure.
Figure 17:
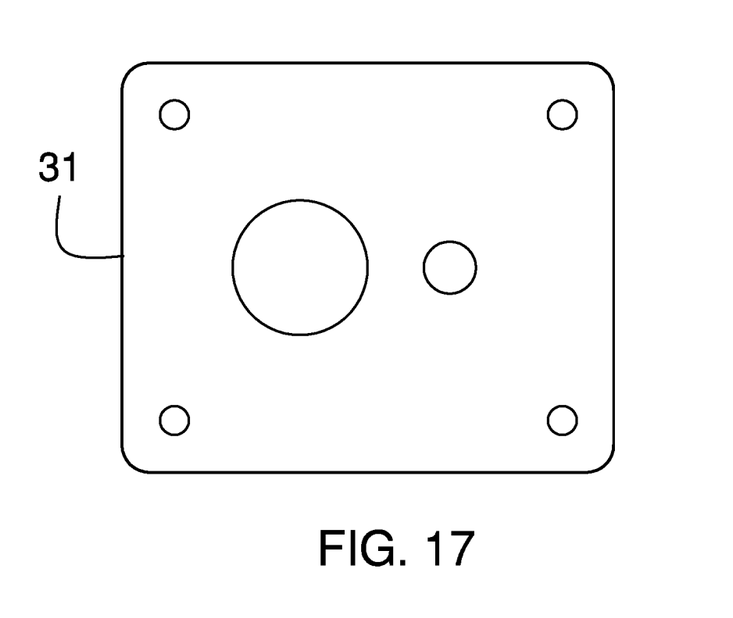
FIG. 17 is a rear view of the first plate of an embodiment of the disclosure.
Figure 18:
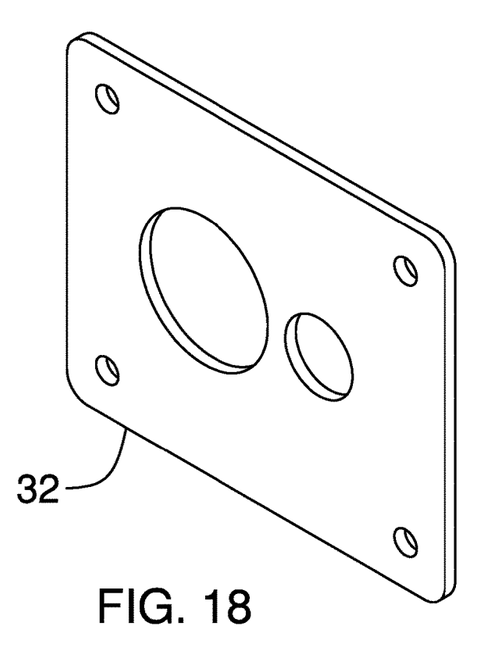
FIG. 18 is a front perspective view of a second plate of an embodiment of the disclosure.
Figure 19:
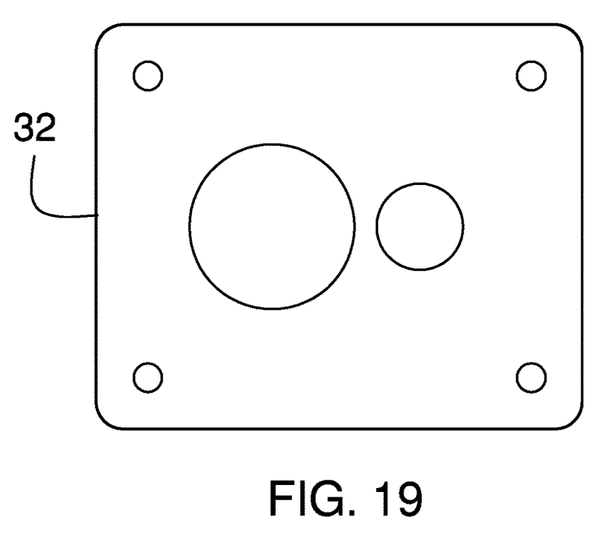
FIG. 19 is rear view of the second plate of an embodiment of the disclosure.
Figure 20:
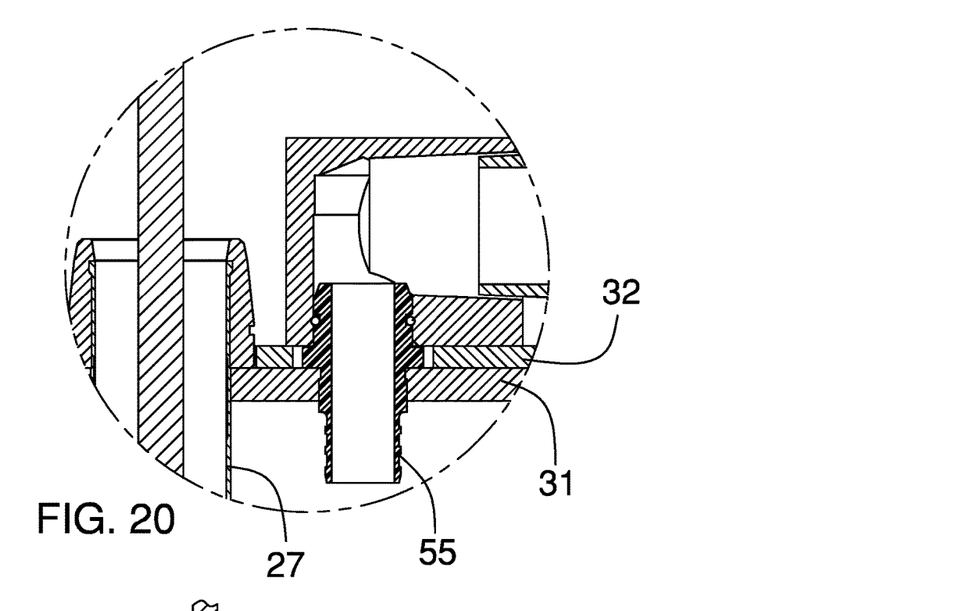
FIG. 20 is a cross-section showing an outlet fitting of an embodiment of the disclosure.
Figure 21:
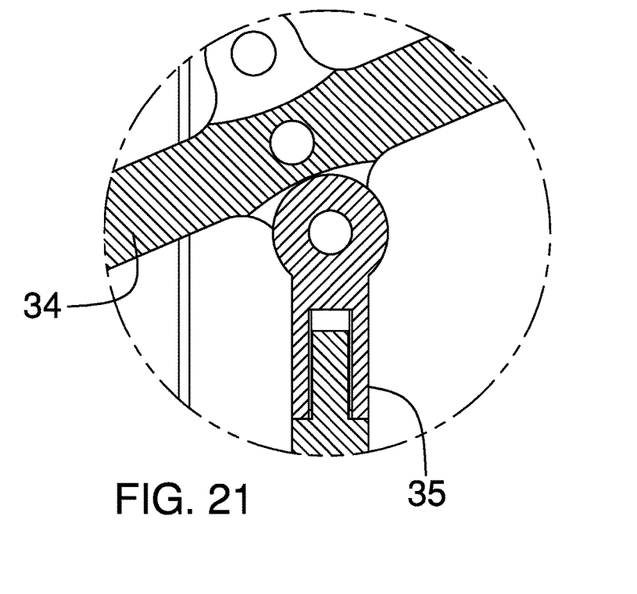
FIG. 21 is a cross-section showing the actuator and a piston rod of an embodiment of the disclosure.

The cylinder 27 is mounted to a plate 31, or plates 31, 32 and covered with an upper housing 33. The upper housing 33 includes an actuator 34 mounted thereto which is attached a piston rod 35 of the piston 28. The actuator 34 may include conventional handle 36 as shown in FIG. 1 which is pivotally coupled to the upper housing 33. However, FIG. 13 shows attachment points 37 for the actuator 34 so that the actuator 34 may be coupled to a motor or windmill to drive the piston 28. Moreover, it should be understood that the upper housing 33 and the components directly attached thereto may be positioned up to several hundred feet from the valve apparatus 22 and lower housing 12 and may not be positioned directly over the lower housing 12 as shown in FIG. 1. FIGS. 16-20 show that plates 31 and 32 may be used so that the upper housing 33 may be removed along with plate 32 while leaving the cylinder 27 in place.

As can be seen in FIG. 8, a lumen 40 is formed between and fluidly couples the inlet chamber 25 and outlet chamber 26. The lumen 40 is angled upwardly from the outlet chamber 26 to the inlet chamber 25 and includes a one way valve 41, which may be formed by a ball, to prevent flow of fluid from the inlet chamber 25 to the outlet chamber 26. When fluid pressure increases within the lower housing 12, the fluid is driven upwardly into the outlet chamber 26 and a small amount of the fluid in the outlet chamber 26 is pushed through the lumen 40 and into the supply line 30 where it can be used for filling the cylinder 27, supply line 30 and bladder 20 in a process of "priming" the assembly 10.

Figure 22:
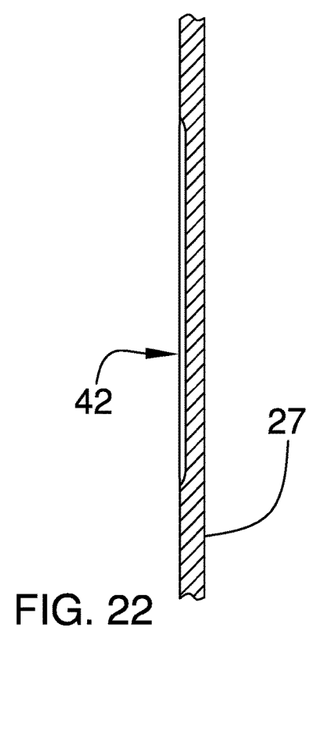
FIG. 22 is a broken cross-section of a cylinder of an embodiment of the disclosure.
Figure 23:
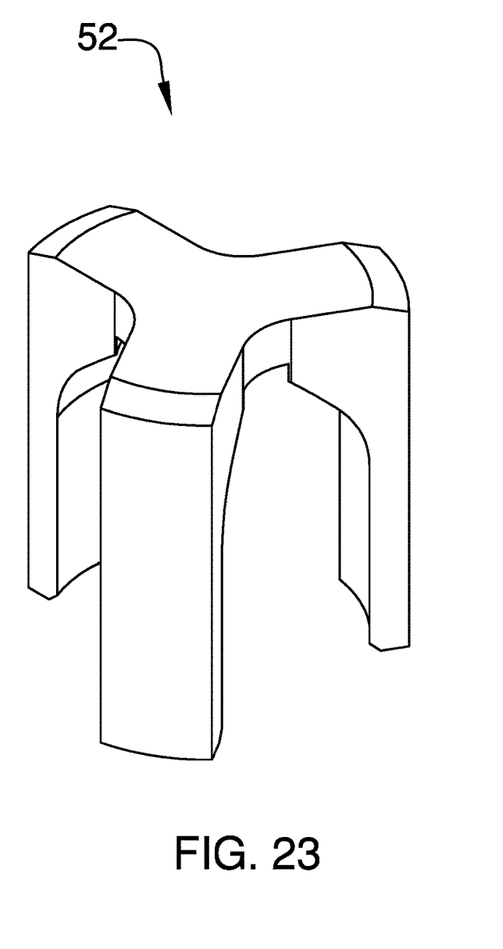
FIG. 23 is a top perspective of a cage of an embodiment of the disclosure.
Figure 24:
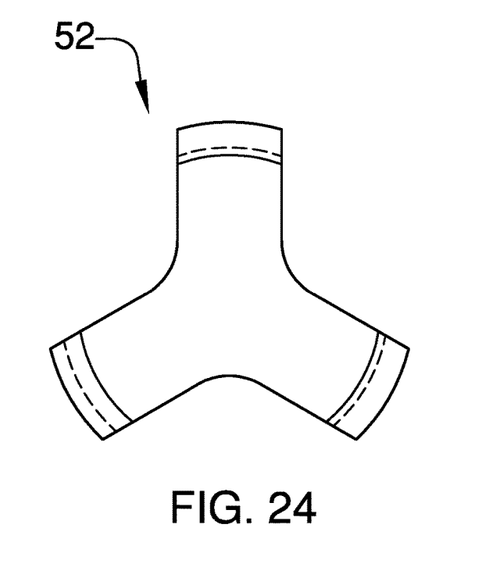
FIG. 24 is a top view of the cage of an embodiment of the disclosure.
Figure 25:
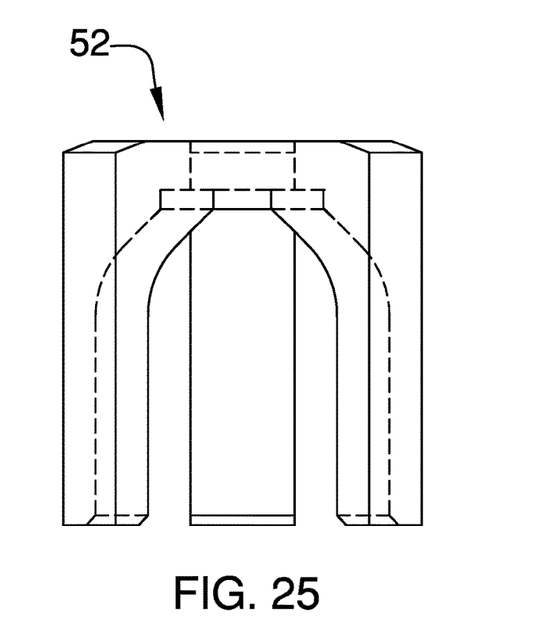
FIG. 25 is a side view of the cage of an embodiment of the disclosure.

As can be seen in FIG. 22, which is a detail of a cross-section of a portion of the cylinder 27, the cylinder 27 has an inner surface with a depression 42 therein which may have a depth of less than 0.02 inches and height of less than 1.0 inches, though the height is greater than a seal formed between the piston 28 and the cylinder 27. The width of this depression is typically less than 0.1 inches. Since the depression 42 has a height greater than the seal between the piston 28 and cylinder 27, when the piston 28 travels downwardly to drive fluid into the supply line 30 and cylinder 27, fluid moves between the piston 28 and the cylinder 27 via the depression 42. This fluid forms a pool on top of the piston 27 to retain pressure within the system and, importantly, prevents contaminated fluid and debris from moving around the piston 28 and back down into the well. The one way valve 41 further prevents contaminated fluid from entering the lower housing 12. Thus, the piston 28, cylinder 27 and supply line 30 are effectively sealed off from the outlet chamber 26.

As can be seen in FIG. 8, the outlet chamber 26 includes a ball valve 50 which prevents fluid from moving back into the lower housing 12. Additionally, when the piston 28 is creating a vacuum in the cylinder 27, any fluid positioned within the outlet chamber 26 between the ball valve 50 and an exit opening 51 will be drawn through the lumen 40 if there is sufficient negative pressure within the inlet chamber 25. A cage 52, shown in FIG. 9 is placed within the outlet chamber 26 to prevent the ball valve 50 from closing the exit opening 51.

An outlet fitting 53 is fluidly coupled to the exit opening 51 and an outlet conduit 54 coupled to the outlet fitting 53. The outlet conduit 54 may be directed where needed to deliver the fluid, though it may be fluidly coupled to a spigot 56 mounted on the upper housing 33. As can been seen in FIGS. 13 and 20, the outlet conduit 54 would be connected to an outlet fitting 55 which would remain with the plate 31 should plate 32 and upper housing 33 be removed. As fluid is forced outwardly of the lower housing 12 by the bladder 20 expanding, it moves through the outlet chamber 26, around the ball valve 50, into the outlet conduit 54 and finally outwardly of the spigot 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A pump assembly comprising:
   a lower housing configured to be positioned into a well, said lower housing having an upper end, a lower end and a perimeter wall extending between said upper and lower ends;
   a one way valve being positioned in said lower housing adjacent to said lower end and being configured for allowing a fluid into said lower housing and restricting fluid from leaving said lower housing through said lower end;
   a bladder being positioned within said lower housing and being attached to said upper end, said bladder being fillable and emptied with fluid wherein said bladder expanding toward said lower end when filled to drive fluid within said lower housing outwardly of said upper end, said bladder forming a vacuum within said lower housing when said bladder is emptied and retracted to pull fluid through said one way valve;
   a valve apparatus being attached to said upper end of said lower housing and being in fluid communication with said lower housing and said bladder, said valve apparatus including an inlet fluidly coupled to said bladder and an outlet for receiving a fluid from said lower housing, said valve apparatus including an inlet chamber fluidly coupled to said inlet and an outlet chamber fluidly coupled to said outlet, said inlet chamber being in fluid communication with a cylinder and a piston mounted in said cylinder, said piston being actuated in a first direct to force fluid downwardly into said bladder and in a second direction to pulling fluid outwardly of said bladder, a connector being fluidly coupled to said inlet chamber, a supply line fluidly coupled to said cylinder being fluidly coupled to said connector, wherein said bladder is expanded when said piston moves downwardly and said bladder is retracted when said piston is moved upwardly;
   said inlet chamber said outlet chamber being fluidly in communication with each other by a lumen, said lumen being angled upwardly from said outlet chamber to said inlet chamber, a one way valve being positioned in said lumen to preventing flow of fluid from said inlet chamber to said outlet chamber, wherein said lumen is configure to allow fluid to be driven from the outlet chamber and into said inlet chamber such that said cylinder is filled with the fluid; and
   an exit opening being in fluid communication with said outlet chamber to allow fluid to flow outwardly of said valve assembly.

2. The pump assembly according to claim 1, said one way valve positioned adjacent to said lower end including a plate having a plurality of apertures extending therethrough, a gasket being flexible and being positioned on top of said plate such that a vacuum is formed within said lower housing, an edge of said gasket being liftable to allow fluid to enter said lower housing through said apertures and around said gasket.

3. The pump assembly according to claim 1, further including:
   an upper housing receiving at least a portion of said cylinder;
   an actuator being mounted on said upper housing; and
   a piston rod being mechanically coupled to said actuator and to said piston.

4. The pump assembly according to claim 1, wherein said cylinder has an inner surface having a depression therein, said depression having a height being less than a height of a seal formed between said piston and said cylinder, said depression being configured to allow fluid to move between said piston and said cylinder such that the fluid forms a pool on top of said piston.

5. The pump assembly according to claim 4, wherein said depression has a depth of less than 0.02 inches, a height of less than 1.0 inches and a width less than 0.1 inches.

6. The pump assembly according to claim 1, further including a ball valve being positioned in said outlet chamber and preventing fluid from moving back into said lower housing from said outlet chamber.

7. The pump assembly according to claim 6, wherein said ball valve includes a ball and a cage holding said ball, said cage preventing said ball from closing said exit opening.

8. A pump assembly comprising:
   a lower housing configured to be positioned into a well, said lower housing having an upper end, a lower end and a perimeter wall extending between said upper and lower ends;
   a one way valve being positioned in said lower housing adjacent to said lower end and being configured for allowing a fluid into said lower housing and restricting fluid from leaving said lower housing through said lower end, said one way valve including a plate having a plurality of apertures extending therethrough, a gasket being flexible and being positioned on top of said plate such that a vacuum is formed within said lower housing, an edge of said gasket being liftable to allow fluid to enter said lower housing through said apertures and around said gasket;
   a bladder being positioned within said lower housing and being attached to said upper end, said bladder being fillable and emptied with fluid wherein said bladder expanding toward said lower end when filled to drive fluid within said lower housing outwardly of said upper end, said bladder forming a vacuum within said lower housing when said bladder is emptied and retracted to pull fluid through said one way valve;
   a valve apparatus being attached to said upper end of said lower housing and being in fluid communication with said lower housing and said bladder, said valve apparatus including an inlet fluidly coupled to said bladder and an outlet for receiving a fluid from said lower housing, said valve apparatus including an inlet chamber fluidly coupled to said inlet and an outlet chamber fluidly coupled to said outlet, said inlet chamber 25 being in fluid communication with a cylinder and a piston mounted in said cylinder, said piston being actuated in a first direct to force fluid downwardly into said bladder and in a second direction to pulling fluid outwardly of said bladder, a connector being fluidly coupled to said inlet chamber, a supply line fluidly coupled to said cylinder being fluidly coupled to said connector, wherein said bladder is expanded when said piston moves downwardly and said bladder is retracted when said piston is moved upwardly;

an upper housing receiving at least a portion of said cylinder;

an actuator being mounted on said upper housing;

a piston rod being mechanically coupled to said actuator and to said piston;

said inlet chamber said outlet chamber being fluidly in communication with each other by a lumen, said lumen being angled upwardly from said outlet chamber to said inlet chamber, a one way valve being positioned in said lumen to preventing flow of fluid from said inlet chamber to said outlet chamber, wherein said lumen is configure to allow fluid to be driven from the outlet chamber and into said inlet chamber such that said cylinder is filled with the fluid;

said cylinder having an inner surface having a depression therein, said depression having a height being less than a height of a seal formed between said piston and said cylinder, said depression being configured to allow fluid to move between said piston and said cylinder such that the fluid forms a pool on top of said piston, said depression having a depth of less than 0.02 inches, a height of less than 1.0 inches and a width less than 0.1 inches;

an exit opening being in fluid communication with said outlet chamber to allow fluid to flow outwardly of said valve assembly;

a ball valve being positioned in said outlet chamber and preventing fluid from moving back into said lower housing from said outlet chamber, said ball valve include a ball and a cage holding said ball, said cage preventing said ball from closing said exit opening;

an outlet fitting being fluidly coupled to said exit opening and an outlet conduit being coupled to said outlet fitting;

wherein the fluid is forced outwardly of said lower housing by said bladder expanding such that fluid moves through said outlet chamber, around said ball valve and into said outlet conduit.

\* \* \* \* \*